United States Patent
Kennedy

(10) Patent No.: US 9,894,906 B2
(45) Date of Patent: Feb. 20, 2018

(54) TENDERIZING KNIFE

(71) Applicant: Danny Kennedy, Carlton, TX (US)

(72) Inventor: Danny Kennedy, Carlton, TX (US)

( * ) Notice: Subject to any disclaimer, the term of this patent is extended or adjusted under 35 U.S.C. 154(b) by 0 days.

(21) Appl. No.: 14/940,339

(22) Filed: Nov. 13, 2015

(65) Prior Publication Data

US 2016/0262408 A1 Sep. 15, 2016

Related U.S. Application Data

(60) Provisional application No. 62/131,892, filed on Mar. 12, 2015.

(51) Int. Cl.
 A22C 9/00 (2006.01)
 B26B 9/02 (2006.01)

(52) U.S. Cl.
 CPC ............... *A22C 9/008* (2013.01); *B26B 9/02* (2013.01)

(58) Field of Classification Search
 CPC ........................................................ A22C 9/08
 USPC ......... 452/102–105; 30/346.56, 346.57, 353, 30/355, 357, 340, 342, 344; 7/113
 See application file for complete search history.

(56) References Cited

U.S. PATENT DOCUMENTS

| | | | | |
|---|---|---|---|---|
| 841,099 A * | 1/1907 | Anderson | ............ | A22C 25/025 30/123 |
| 2,049,823 A * | 8/1936 | Reichert, Jr. | ........... | B26F 1/382 30/273 |
| 2,059,414 A * | 11/1936 | Taylor | ....................... | B26B 9/02 30/355 |
| 2,142,197 A * | 1/1939 | Lee | ...................... | A22C 25/006 452/137 |
| 2,315,898 A * | 4/1943 | Krilow | ...................... | B26B 9/02 30/345 |
| 2,671,267 A * | 3/1954 | Michalek | ................. | B26D 7/10 30/277.4 |
| 2,685,131 A * | 8/1954 | Seeberger | ................. | B26B 9/02 30/355 |
| 2,685,734 A * | 8/1954 | Klein | ................... | A22B 5/0047 30/144 |
| 2,825,968 A | 9/1956 | Baer | | |
| 3,024,533 A | 3/1962 | Nitsch | | |
| 3,178,765 A * | 4/1965 | Gorton, Jr. | ........... | A22C 25/025 452/3 |
| 3,324,910 A | 5/1965 | Benedict | | |
| 3,271,814 A * | 9/1966 | Gorton, Jr. | ........... | A22C 29/024 452/3 |
| 3,279,065 A | 10/1966 | Senkewitz | | |

(Continued)

*Primary Examiner* — Richard Price, Jr.
(74) *Attorney, Agent, or Firm* — Global Intellectual Property Agency, LLC; Jordan Sworen

(57) ABSTRACT

A tenderizing knife for use in tenderizing meat, such as steak or poultry and the like. The knife includes an elongated cutting blade having a handle on a proximal end thereof. A first edge of the cutting blade is serrated, while the second edge of the cutting blade is blunt. The first edge comprises a square serration pattern, wherein the square shaped serrations are spaced at a fixed interval and help to allow the user to tenderize the meat rather than cut therethrough. The distal end of the cutting blade includes a smooth edge for use in cutting through the meat in the traditional fashion. In operation, the user can make a series of small cuts across the meat using the serrated edge in order to tenderize the meat prior to cooking.

9 Claims, 2 Drawing Sheets

(56) References Cited

U.S. PATENT DOCUMENTS

| | | | | |
|---|---|---|---|---|
| 3,745,869 A | * | 7/1973 | Ludwig | B26D 1/0006 |
| | | | | 144/223 |
| 4,423,351 A | * | 12/1983 | Sugimori | H01J 9/244 |
| | | | | 313/420 |
| 4,759,126 A | * | 7/1988 | McCoy | A22C 29/024 |
| | | | | 30/120.1 |
| 4,823,467 A | | 4/1989 | Campbell et al. | |
| 5,133,132 A | * | 7/1992 | Yu | B26B 9/02 |
| | | | | 30/286 |
| 5,232,430 A | * | 8/1993 | Nitsch | B26D 7/27 |
| | | | | 383/35 |
| 7,169,033 B1 | * | 1/2007 | Colbert | A22C 29/024 |
| | | | | 452/103 |
| 7,370,384 B2 | | 5/2008 | Miller et al. | |
| 8,157,619 B2 | * | 4/2012 | Baratta | B23D 61/026 |
| | | | | 125/15 |
| 8,894,029 B2 | * | 11/2014 | Agbodoe | A61B 17/0293 |
| | | | | 248/298.1 |
| 9,061,427 B2 | * | 6/2015 | Rubin | B26B 11/00 |

* cited by examiner

TENDERIZING KNIFE

CROSS REFERENCE TO RELATED APPLICATION

This application claims the benefit of U.S. Provisional Application No. 62/131,892 filed on Mar. 12, 2015. The above identified patent application is herein incorporated by reference in its entirety to provide continuity of disclosure.

BACKGROUND OF THE INVENTION

Field of the Invention

The present invention relates to knives. More specifically, the present invention provides a knife for use in tenderizing meat, such as beef and poultry, among others. The knife comprises a cutting blade with a square serration pattern.

Meat is often tenderized in order to be prepared for cooking. Tenderizing the meat helps to break down the collagen in the meat in order to make the meat more palatable. Tenderizing is accomplished via mechanical tenderization, wherein the user pounds or pierces the meat. Typically, meat is tenderized by means of a conventional tenderizing tool resembling a mallet having a ridged surface. However, this tenderizing tool is only useful for pounding or tenderizing the meat, and has limited additional functionality.

When preparing meat, the user is also required to use a knife in order to cut fat from the meat. Thus, the user must use a first tool for tenderizing the meat in addition to a knife in order to strip the fat from the meat. Using multiple tools is time consuming and inconvenient. Therefore, a tenderizing knife for use in tenderizing meat that can also be used as a conventional knife is desired.

Devices have been disclosed in the prior art that relate to knives having serrated edges. These include devices that have been patented and published in patent application publications. These devices generally relate to knives with serrated edges of various configurations, such as U.S. Pat. No. 3,279,065, U.S. Pat. No. 4,823,467, U.S. Pat. No. 3,024,533, U.S. Pat. No. 2,825,968, U.S. Pat. No. 3,324,910, and U.S. Pat. No. 7,370,384.

These prior art devices have several known drawbacks. The devices in the prior art provide knives having serrated edges, but the prior art fails to disclose knives having a square shaped serration pattern. Further, the knives in the prior art are not adapted for use in tenderizing meat and can only be used to cut the meat.

In light of the devices disclosed in the prior art, it is submitted that the present invention substantially diverges in design elements from the prior art and consequently it is clear that there is a need in the art for an improvement to existing tenderizing knife devices. In this regard the instant invention substantially fulfills these needs.

SUMMARY OF THE INVENTION

In view of the foregoing disadvantages inherent in the known types of knives now present in the prior art, the present invention provides a new tenderizing knife wherein the same can be utilized for providing convenience for the user when tenderizing meat.

It is therefore an object of the present invention to provide a new and improved tenderizing knife having a cutting blade with a first edge having square shaped serrations thereon, wherein the serrations are adapted to make small cuts across a piece of meat so as to tenderize the meat It is another object of the present invention to provide a tenderizing knife having a cutting blade with an ergonomic handle on the proximal end thereof.

Another object of the present invention is to provide a tenderizing knife having a cutting blade with a dull or blunt second edge that can be pressed on by the user to apply pressure to the serrated edge.

Yet another object of the present invention is to provide a tenderizing knife having a distal end with a smooth cutting edge thereon for cutting through meat.

Another object of the present invention is to provide a tenderizing knife that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
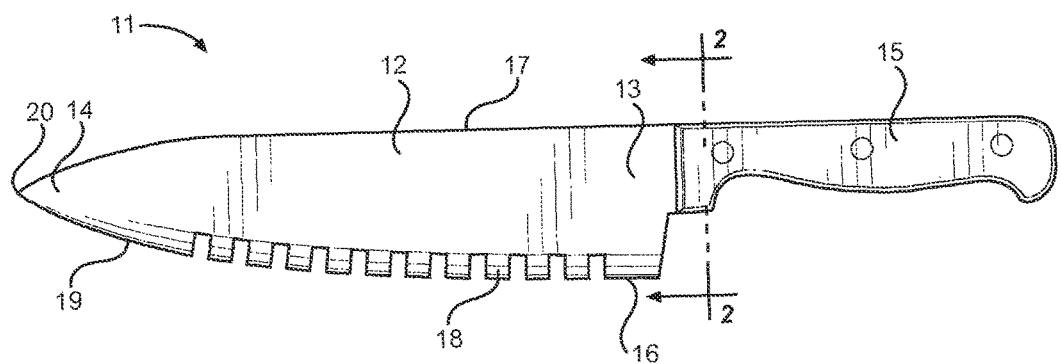
FIG. 1 shows a side view of the tenderizing knife.
Figure 2:
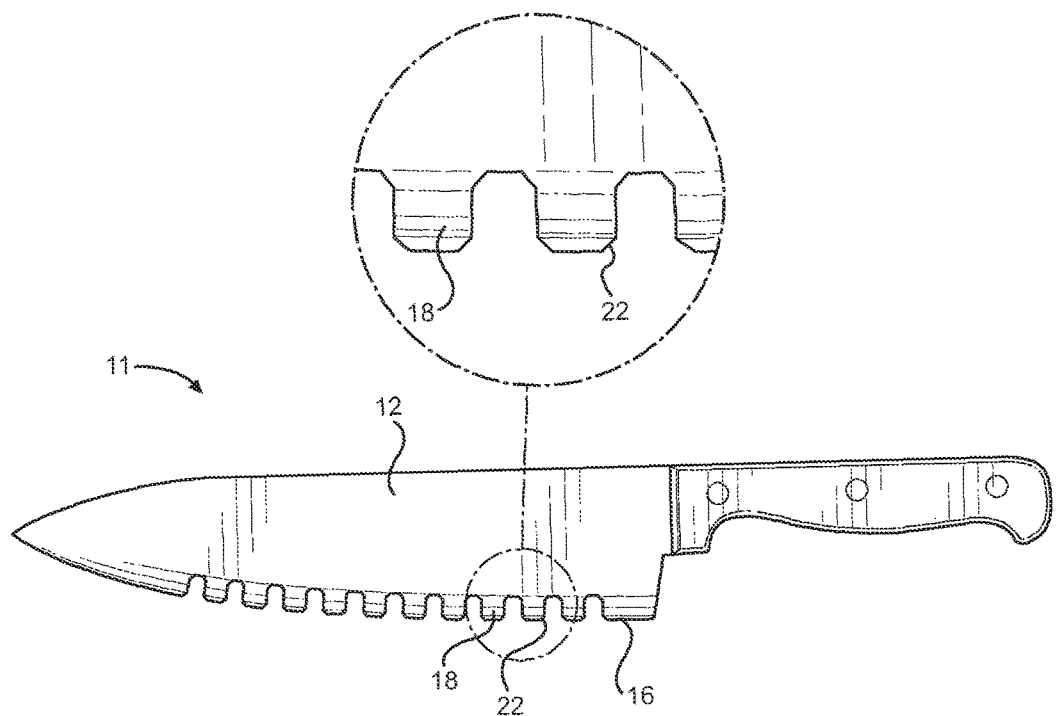
FIG. 2 shows a side view of an alternate embodiment of the tenderizing knife.

Reference is made herein to the attached drawings. Like reference numerals are used throughout the drawings to depict like or similar elements of the tenderizing knife. For the purposes of presenting a brief and clear description of the present invention, the preferred embodiment will be discussed as used for tenderizing meat. The figures are intended for representative purposes only and should not be considered to be limiting in any respect.

Referring now to FIG. 1, there is shown a side view of the tenderizing knife. The tenderizing knife 11 comprises a cutting blade 12 having a proximal end 13 and a distal end 14. The cutting blade 12 comprises a handle 15 on the proximal end 13 thereof. The handle 15 can be gripped by a user in order to control and maneuver the tenderizing knife 11. The handle 15 preferably has an ergonomic shape so that it can be easily held in the hand of a user.

The cutting blade 12 comprises a first edge 16 and a second edge 17. The first edge 16 comprises a plurality of square shaped serrations 18 thereon. The serrations 18 extend from the proximal end 13 of the cutting blade 12 towards the distal end 14 thereof. The square shaped serrations 18 allow a user to tenderize meat rather than cut through the meat. The square shaped serrations 18 do not cut cleanly through the meat and instead leave a jagged or rough cut in the meat. The square shaped serrations 18 extend along the first edge 16 of the cutting blade 12 in a repeating pattern. Preferably, the serrations 18 are spaced at a fixed interval. In some embodiments, the square shaped serrations 18 comprise angled or beveled corners 22 as shown in FIG.

2. The beveled corners 22 help to improve the strength of the serrations 18 and to minimize risk of chipping or damage occurring to the serrations 18. In such embodiments, the serrations 18 lack any right angles and instead include angled corners 22.

The first edge 16 of the cutting blade 12 further comprises a cutting edge 19 disposed on the distal end 14 thereof. The distal end 14 of the cutting blade 12 comprises a cutting edge 19 that can be used to cut meat in the conventional manner. The cutting edge 19 allows the user to cut fat from the meat or otherwise prepare the meat prior to cooking the same. Thus, a portion of the first edge 16 comprises serrations 18 thereon, and a second portion includes a cutting edge 19 having a smooth or curved edge. The distal end 14 of the cutting blade 12 further comprises a sharpened tip 20 wherein the first edge 16 intersects the second edge 17. The tip 20 can be used to stab a piece of meat in order to cut into the piece of meat.

The second edge 17 of the cutting blade 12 comprises a dull or blunt edge. The second edge 17 is dull so that a user can guide the knife by pressing his or her hand or palm onto the second edge 17 of the knife 11. The dull second edge 17 also helps to prevent the user from cutting himself or herself while using the knife 11. The second edge 17 is preferably dull along the length thereof, from the proximal end 13 to the distal end 14.

Figure 3:
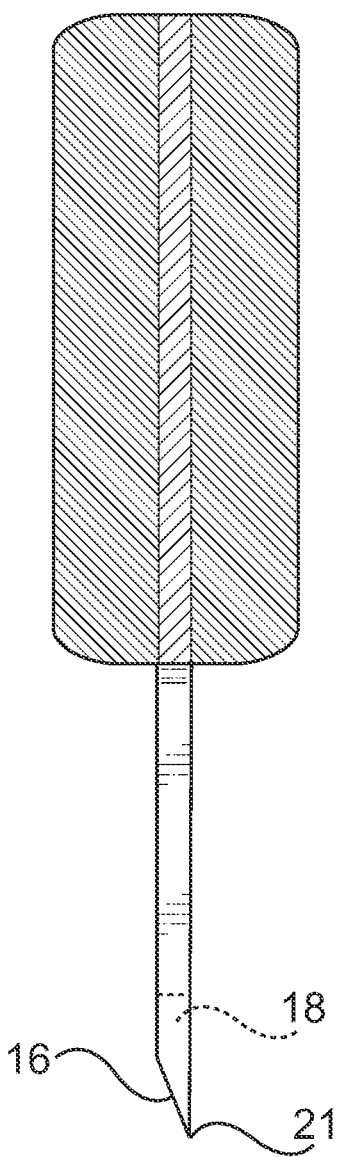
FIG. 3 shows an end view of the cutting blade of the tenderizing knife.

Referring now to FIG. 3, there is shown an end view of the cutting blade of the tenderizing knife. The first edge 16 of the knife is sharpened such that the first edge 16 forms a point 21 therealong. The serrations 18 and the cutting edge taper towards a point 21 so that the first edge 16 is sharp and can be used to tenderize a piece of meat. In the illustrated embodiment, the front surface of the blade tapers towards the rear surface thereof. However, in alternate embodiments, the front surface and rear surface taper towards one another so as to intersect centrally relative to the width of the cutting blade.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tenderizing knife, comprising:
a cutting blade having a first edge;
wherein said first edge comprises a plurality of square shaped serrations;
the plurality of square shaped serrations comprising a front surface and a rear surface, wherein the front surface tapers towards the rear surface such that the rear surface is linear and extends perpendicular to a second edge of the cutting blade.

2. The tenderizing knife of claim 1, wherein said second edge of the cutting blade that is blunt.

3. The tenderizing knife of claim 1, wherein said cutting blade comprises a proximal end having a handle thereon.

4. The tenderizing knife of claim 1, wherein said cutting blade comprises a distal end that forms a sharpened tip.

5. The tenderizing knife of claim 1, wherein said first edge of said cutting blade further comprises a smooth portion on a distal end thereof.

6. The tenderizing knife of claim 1, wherein said square shaped serrations are spaced at a fixed interval.

7. The tenderizing knife of claim 6, wherein said square shaped serrations taper towards a point along said first edge of said cutting blade.

8. The tenderizing knife of claim 1, wherein all of said square shaped serrations comprise corners that are beveled.

9. A tenderizing knife, comprising:
a cutting blade having a proximal end, a distal end, a first edge, and a second edge;
the first edge having a plurality of square shaped serrations extending from the proximal end toward the distal end of the cutting blade, wherein the plurality of square shaped serrations are adapted to tenderize meat;
a smooth portion on said distal end of the cutting blade adapted for use in cutting into meat;
the plurality of square shaped serrations comprising a front surface and a rear surface, wherein the front surface tapers towards the rear surface such that the rear surface is linear and extends perpendicular to the second edge of the cutting blade;
wherein a pair of serrations comprise a groove therebetween, wherein each corner of the pair of serrations and the groove are beveled;
a handle disposed on the proximal end of the cutting blade.

* * * * *